United States Patent [19]
Brazan

[11] 3,804,078
[45] Apr. 16, 1974

[54] TRACTOR CARRIED, DRY CANE LEAVES BURNER POSITIONER AND METHOD OF USE

[76] Inventor: Harry J. Brazan, Rt. 1, Box 193, Vacherie, La. 77090

[22] Filed: June 2, 1971

[21] Appl. No.: 149,200

[52] U.S. Cl. ............................. 126/271.2 C
[51] Int. Cl. ............................. F24c 5/06
[58] Field of Search ............ 126/271.2 R, 271.2 A, 126/271.2 C; 239/169, 176

[56] References Cited
UNITED STATES PATENTS

| | | | |
|---|---|---|---|
| 3,565,341 | 2/1971 | Burroughs | 239/169 X |
| 2,530,894 | 11/1950 | McLemoke | 126/271.2 C |
| 2,839,047 | 6/1958 | Davisson et al. | 126/271.2 C |
| 3,224,430 | 12/1965 | Reifschneider | 126/271.2 C |
| 3,270,632 | 9/1966 | Schultz | 126/271.2 C |

FOREIGN PATENTS OR APPLICATIONS
569,453   1/1924   France ................ 126/271.2 C Primary Examiner—William F. O'Dea
Assistant Examiner—Harold Joyce
Attorney, Agent, or Firm—William E. Ford

[57] ABSTRACT

The disclosed invention includes a boom connected to be rotated by manipulative means from the prime mower driver's seat to be selectively swung about pivot centrally of tool bar transversely arcuately across the harvested and row stacked cane for boom rear end carried burner disposition to discharge flame to ignite the dry leaves on the windward end of the pair of row stacked cane stalks. The swing means also includes means constantly to assure burner discharge in direction of prime mower travel. The prime mower travels down a passage row between pairs of cane stalked stacked rows and turns at rows ends to return down a next adjacent passage row as the driver manipulates boom swing for burner discharge disposal as aforesaid.

24 Claims, 7 Drawing Figures

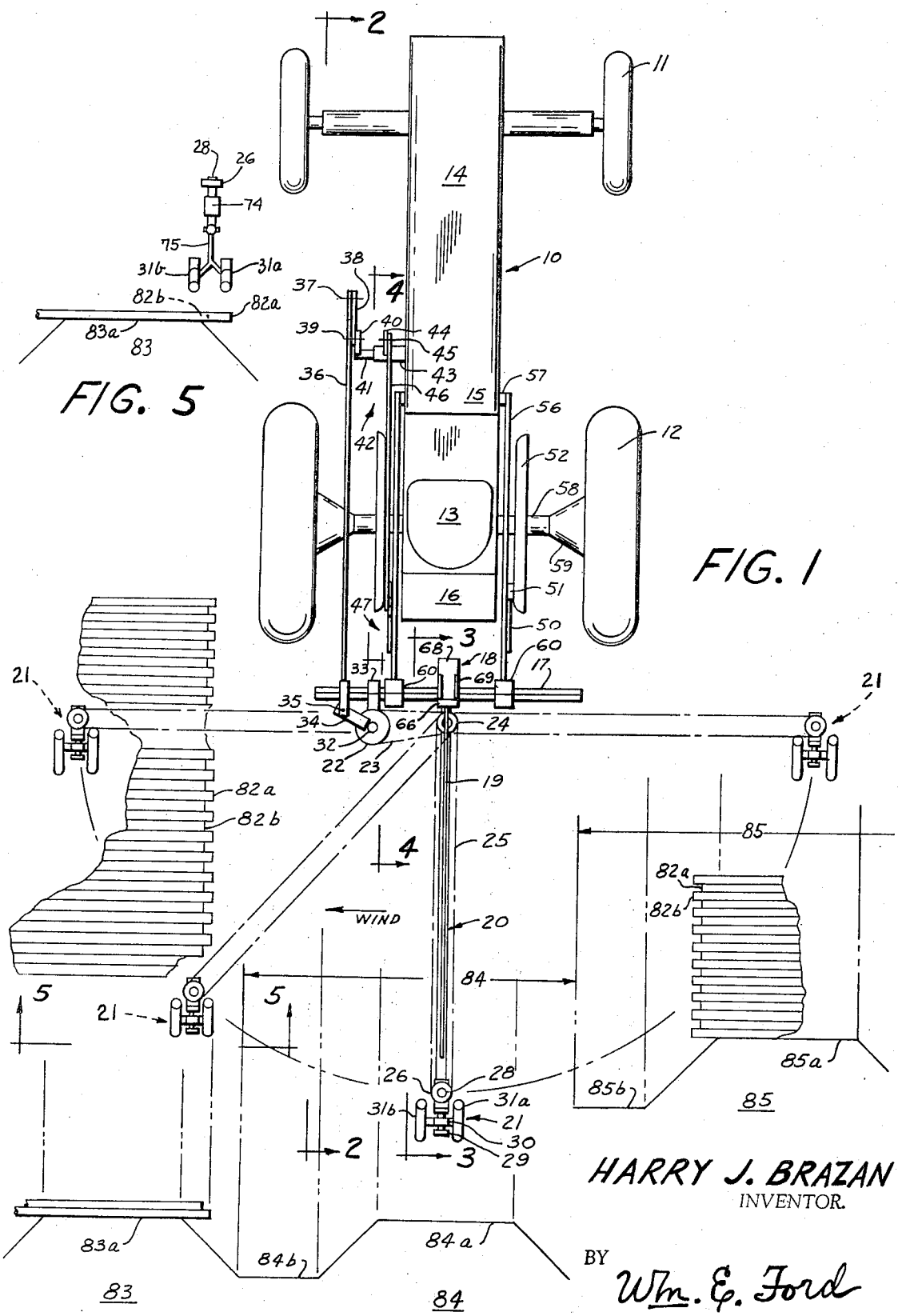

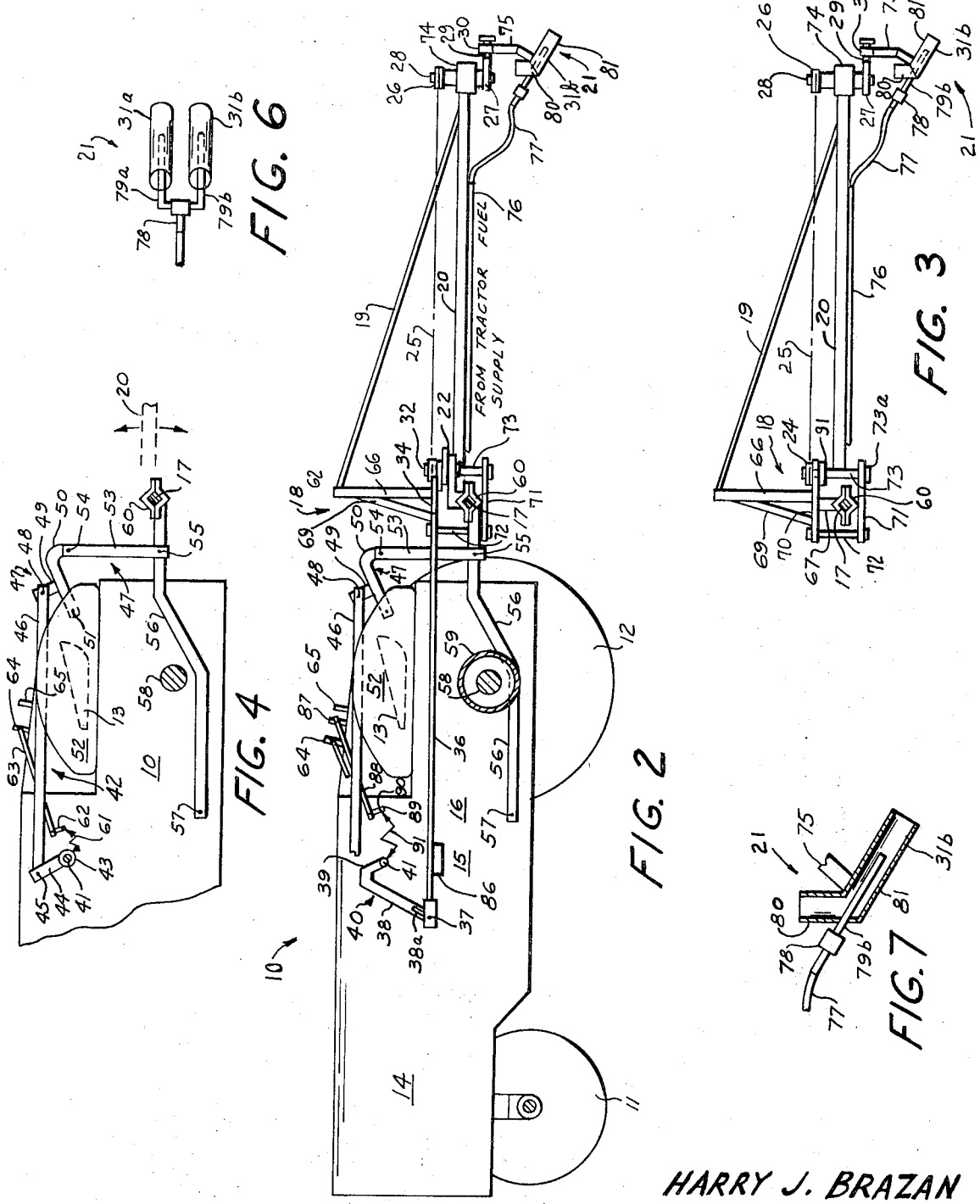

3,804,078

TRACTOR CARRIED, DRY CANE LEAVES BURNER POSITIONER AND METHOD OF USE

THE PROBLEM REQUIRING SOLUTION

As cane, such as sugar cane, has heretofore been harvested and milled, the juice is squeezed out of the interior of the stalks, leaving the skin or sheath together with the interior pith as bagasse, a by-product, but mixed in therewith, and often with juice adhering thereto, is so much trash, as from the stalk roots and any unburned leaves taken on the stalks to the mill.

Heretofore an important operation, after the cane has been mowed and stacked transversely across cane rows, has been the steps of endeavoring to burn off most of the leaves and trash, usually by hand. Any mechanization of this step has heretofore been very primitive and comparatively unsuccessful.

THE INVENTION OF THE APPLICANT

The applicant has adapted a conventional prime mower generally to follow after the harvester closely in point of time, but when the leaves are dry, quickly and positively to burn off the dry cane leaves, desirably on a day when there is some wind preferably blowing across the harvested cane rows. As is well known the harvesters of modern design both mow the cane and transport the stalks through the machine to be stacked horizontally by the harvester boom selectively across the cane rows. The cane thus does not have to be left on the respective row from which it has been cut. Thus this invention best presupposes the cane stalks stacked transversely across pairs of rows separated by a passage row between adjacent pairs of rows, no stalks being staked on the passage row. Thus the prime mower wheels, as those of a tractor, may go down the furrows on opposite sides of the passage row, while the burner carrying boom may be swung for burner disposal just to windward of the ends of the stalks on any respective pair of rows. Also the invention includes means constantly to keep burner flame discharge direction directly rearwardly. The invention thus provides apparatus to adopt a conventional tractor for quick and efficient burning of leaves from stacked cane stalks, and in accordance with effective method steps to be followed.

OBJECTS OF THE INVENTION

As aforesaid the invention relates to a tractor carried, dry cane leaves burner positioner and method of its use, whereby to mechanize for efficiency and to speed up the burning of dry leaves from harvested and stacked stalks of cane.

As a primary object the invention provides apparatus and method whereby a conventional tractor may be adapted selectively to burn the leaves from harvested and stacked cane stalks most effectively when the cane has been harvested and stacked after a predetermined pattern.

It is also another object of the invention to provide apparatus and method of this class, whereby a single tractor mounted lever may be added for manipulation from the driver's seat, whereby to regulate boom swing about central pivot on tool bar, and also to accomplish constant burner swing on rear end of boom, thus for burner positioning to discharge substantially directly rearwardly on the windward ends of cane stalks stacked across a pair of rows downwind from axis of tractor travel.

Other and further objects will be apparent when the specification hereinbelow is considered in connection with the drawings, in which:

Other and further objects will be apparent when the specification hereinbelow is considered in connection with the drawings, in which:

FIG. 1 is a plan view of a tractor equipped with an embodiment of dry cane leaves burner positioner showing cane rows, (part in illustrative sectional elevation), and burner positions in relation to cane stalks, as cut and stacked on rows by harvester;

FIG. 2 is a longitudinal elevational view taken along line 2—2 of FIG. 1;

FIG. 3 is a longitudinal elevational view taken along line 3—3 of FIG. 1 showing further detail of the swinging burner carrying boom support;

FIG. 4 is a longitudinal elevational view taken along line 4—4 of FIG. 1, repeating for clarity burner carrying boom lowering and raising details;

FIG. 5 is a transverse elevational view, taken along line 5—5 of FIG. 1, showing position of burner with relation to a harvester cut and stacked row of cane; and FIG. 6 is a plan view of burner detail, showing fuel supply thereto; and FIG. 7 is a larger scale, sectional elevational view taken along line 7—7 of FIG. 6.

Referring now to the drawings in which like reference numerals are applied to like elements in the various views, a tractor 10 is shown in FIG. 1, with steering wheel not shown, for purpose of clarity. The tractor has forwardly small directive wheels 11, large rear drive wheels 12, driver's seat 13, engine 14 forwardly thereof, transmission 15 behind the engine but indicated forwardly of the driver's seat 13, and differential 16 to the rear of the transmission 15, these elements being indicated positionally or diagrammatically. A conventional tool bar 17 is shown extending transversely across the rear end of the tractor, and mounted therefrom as will be hereinbelow described. Centrally of the tool bar 17, a support bracket assembly 18 is shown in FIG. 1 with a support rod 19, extending rearwardly for rear end attachment to a swing boom 20 with a burner swing sprocket 21 shown above the boom 20 rearwardly of the support rod 19 and a burner assembly 21, as will be hereinbelow described, extending below and rearwardly of the rear end of the boom 20.

Also, in FIG. 1, a large sprocket 22 may be shown driving, through a sprocket chain 23, a pinion sprocket 91, FIG. 3, not shown in FIG. 1, but fixed to the same shaft 73 (FIG. 3) as a corresponding pinion sprocket 24 thereabove, which, through a sprocket chain 25 drives a pinion sprocket 26 fixed to a shaft 28 journalled in a support block, now shown in FIG. 1. This support block 74 is affixed to the end of the swing boom 20, the support bracket 27 of the burner assembly 21 being rigidly fixed to the lower end of the sprocket shaft 28. Rigidly, directly rearwardly extending from the sprocket shaft 28, is a shaft 29 which passes through a strap or hub 30 which is rigidly connected to burners 31a, 31b, on either side thereof.

The large sprocket 22 is indicated in FIG. 1 as having the axle 32 to which it is affixed journalled in a bracket 33 which extends rearwardly from the tool bar 17. A bar or lever 34 is rigidly affixed, as by welding, to the axle 32, and has its outer end operatively connected by a vertical pin 35 which extends into an oversized hole or slot therein, not shown, to connect the lever 34 with the rearward end of a control rod 36 having its forward end pivotally connected by a pin 37 that extends into a slot 38a in the long, lower arm 38 of a bell-crank lever 40 that has its short arm 39 which is conventionally rigidly connected to the outer end of a conventionally supplied inner shaft 41 conventionally adapted to be power rotated when connected with the transmission supplied hydraulic system of the tractor 10, as will be hereinbelow described.

Also, as shown in FIG. 1, mechanism 42 is shown inwardly of the control rod 36 that is conventionally supplied with tractors for the purpose of selectively raising and lowering the tool bar 17 supplied for the purpose of mounting various conventional accessory implements, as plows, harrows and the like. This conventionally supplied apparatus includes a lever 44 rigidly affixed at inner end to a hollow shaft 43 which is concentric about the aforesaid shaft 41. The lever 44 is pivotally connected at its outer end by a horizontally extending pivot pin 45 to a linkage bar 46. The conventional sub-assembly, inwardly of, rearwardly of, and below the linkage bar 46, for transmitting lift or lowering to the tool bar 17, is generally designated by the reference numeral 47, and will be hereinbelow described with relation to FIG. 4.

Now considering FIG. 1 with relation to the elevational view of FIGS. 2 and 4, the linkage bar 46 is shown connected by a horizontally extending pivot pin 48 to the aforesaid subassembly 47, and specifically to a lug 49 that is rigidly connected to upstand centrally from a pivoted support lever 50 having its forward end pivotally connected to a transversely extending pivot pin 51 built into the fender 52. A pivoted support linkage 53 has its upper end pivotally connected by a transversely horizontally extending pivot pin 54 to the recurved, rear end of the pivoted support lever 50; its lower end being pivotally connected by a substantially horizontally, transversely extending pivot pin 55 to a tool bar support member 56.

The member 56 has its forward end pivotally connected to a pivot pin 57 which is conventionally provided to extend outwardly, sidewardly, from the side of the housing of the tractor 10. Note that the support member 56 extends under the axle 58 and clears the inner part of the axle hub 59, FIG. 2, and then extends upwardly and then directly rearwardly to terminate rearwardly in a clamp 60 about the tool bar 17. A consideration of FIG. 1 shows that the opposite or right side of the tractor 10 has correspondingly constructed and disposed parts 57, 56, 52, 58, 59, 51, 50 and 60 provided as shown in FIGS. 2 and 4. It is thus indicated that the tool bar 17 is equally supported on each side.

As best shown in FIG. 4, the concentrically disposed shaft 43 about the aforesaid shaft 41 is mechanically connectable, as indicated by the zagged line 61, to a lever 62 which is conventionally provided to be moved to cut in the power of the hydraulic system of the tractor transmission to apply its power to rotate the hollow shaft 43 and in direction selected. The lever 62 in FIG. 4 is indicated as having the upper, forward end portion thereof pivotally connected to the forward end of a push and pull rod 63 with rear end pivotally connected to a tool bar elevation control lever 64 handled from the driver's seat 13.

It may thus be seen that movement of the lever 62 about its pivot by urging the tool bar elevation control lever 64 in one direction will cut in the transmission provided hydraulic system 61 to act so long as the lever 62 is urged, and during this period will cause rotation of the hollow shaft 41, and consequent movement of the mechanism 42, including the sub-assembly of mechanism 47, say to rotate the tool bar 17, and any accessory rigidly attached thereto, as the boom 20, indicated in FIG. 4, about the pivot pin 57. This direction may be upwardly as indicated by the upper arrow above the boom 20 in FIG. 4, and this movement stops as soon as the driver ceases to urge the elevation control lever 64 in the direction aforesaid. The tool bar 17 and boom 20 will thus remain fixed in thus predetermined operational position.

Correspondingly, should it be desired to lower the tool bar 17 and the accessory connected thereto, as the boom 20, as indicated by the arrow below the boom 20 in FIG. 4, the dirver may urge the lever 62 in direction opposite the direction aforesaid. While the lever 62 is thus urged, the hydraulic system 61 of the transmission hydraulic system 61 is cut in to rotate the hollow shaft 41 in direction opposite the direction aforesaid, thus to move the mechanism 42, including the sub-assembly 47 thereof, so that the tool bar 17 and its attached boom 20 are rotated downwardly about the pivot pin 57. The driver's hand is thus removed from urging against the elevation control lever 64 to leave the tool bar 17 and boom 20 lowered as desired. It should be noted that the apparatus hereinabove described in the four preceding paragraphs is generally supplied with the tractor, but its description and operation is set forth because of relationships to be hereinbelow described.

Heretofore the apparatus and method considered as new has been introduced, and background elements described, and now consideration may be given to FIGS. 1, 2 and 3 as to further details of structure and operation. The bracket assembly 18 of FIG. 1, includes the brace rod or guy member 19 to the outer end of the cantilevered, swingably boom 20, as aforesaid. The upper or forward end of the guy rod 19 is shown in FIGS. 2 and 3 as attached to the upper end of an upright post 66 which upstands centrally from an upper base plate 70 of the bracket assembly 18 that is supported centrally therebelow by upright plate means 67 that upstands from the upper member of a center clamp 60 about the central portion of the tool bar 17. A forwardly disposed brace plate 69 braces the upright post 66 oppositely of the guy rod 19.

A lower base plate 71 is indicated as connected to the upper base plate 70 forwardly by nut and bolt means 72, and rearwardly by a shaft 73 which has the upper sprocket 24 affixed thereto just above the upper base plate 70 and a lower sprocket 91 affixed thereto just below the upper base plate 70. Therebelow the boom 20 is rigidly affixed to the boom swing shaft 73, as by welding. A head 73a is indicated as being provided on the shaft 73 to shoulder against the underside of the lower base plate 71, while the upper end of the boom swing shaft 73 may be threaded to have conventional nut means threaded thereon to complete the bracket assembly 18, the upper surface of the lower base plate 71 thus bearing centrally thereof against the apex of the lower member of the clamp 60. The bracket assembly 18 may thus be seen to stand out as both a central and multi-functional sub-combination of special novelty and utility.

At the rear end of the boom 20, the aforesaid sprocket 26, of the same diameter as the sprocket 24, is affixed to the shaft 28, which may shoulder upon, and which is journalled in a support block 74, hereinabove referred to as being affixed to the rear end of the boom 20, but without reference numeral identification. Below the support block 74, the shaft 29, hereinabove described as extending rearwardly from the shaft 28, is indicated as being rigidly assembled with the shaft 28, to extend rearwardly with axis normal thereto. The aforewaid connection of the hub 30, (through which the horizontal shaft 29 extends), and the burners 31a, 31b, is made by straps 75, which are welded to the burners in manner to direct the discharge from the burners downwardly and rearwardly, the burner 31b being shown in the elevational views of FIGS. 2 and 3, and in the sectional view of FIG. 7.

As indicated in FIG. 2, a fuel conduit 76 extends FROM TRACTOR FUEL SUPPLY along the boom 20 and thence through a flexible conduit 77 to a special tee 78 from the opposite ends of which discharge nozzles 79a, 79b extend into the respective transversely spaced apart burners 31a, 31b, FIG. 6. The discharge nozzles 79a, 79b, being L-shaped, serve to rigidly space the respective burners 31a, 31b, apart, as they extend through the respective upright upper legs 80 of the respective burners 31a, 31b, and are rigidly connected thereto, and discharge within the respective, downwardly directed lower legs 81. The burners 31a, 31b, are provided in duplicate, spaced apart, to insure that they cover in ignited fuel discharge the windward ends of cane stalks 82a, 82b, shown diagrammatically in FIG. 1, as the stalks are not stacked with ends in exact longitudinal alignment across the rows.

Referring now to FIG. 1 with relation to FIGS. 2 and 3, and FIGS. 5 – 7, it is shown in FIG. 2 that the large sprocket 22 is fixed to a shaft or axle 32, that is journalled in the bracket 33 rigidly supported by the tool bar 17. The pin 35 that connects the linearly moved rod 36, FIG. 1, to the rotated bar or lever 34 on the large sprocket 22, must fit in an oversized hole or arcuate slot, not shown, in the lever 34, to permit cooperative movement of these two members. It may be considered that, in the position of the lever 34 in FIG. 1, the boom 20 is in farthest left position, and the lever 34 and rod 36 are in farthest forward positions. Then the total linear travel of the sprocket chain 23 on the root periphery of the large sprocket 22 to move the lever 34 from the position shown in FIG. 1 to the rearmost position thereof is equal to 180° of movement of the sprocket chain 23 around the root periphery of the small lower central or boom swing sprocket 74 to the shaft 73 of which the boom 20 is rigidly affixed, the sprocket 74 being in turn affixed to the shaft 73 as aforesaid. In this rearmost position of the lever 34 the boom 20 will have been swung to the farthest right position indicated in FIG. 1 or 180° in angular travel in correspondence with sprocket chain 23 maximum travel on the sprocket.

Now considering the small upper central sprocket 24, of the same size as the boom swing sprocket therebelow, with relation to the small boom end sprocket 26, of the same root diameter or periphery, the sprocket chain 25 which extends between and around the sprockets 24, 26 thus rotates the sprocket 26, affixed to the burner swing shaft 28, to rotate this shaft 28 through 180°, as the boom 20 is swung from farthest left to farthest right position. Correspondingly, it can be seen that the burners move from left position with axes at right angles to the boom 20; through central position with boom axis and burner axes parallel, or with burner support shaft 29 in co-axial extension of boom 20; to right position with axes again at right angles to the boom 20.

With this arrangement it can be seen that at whatever angle the boom 20 may extend, the burner axes are directed to extend straight rearwardly, or parallel to the cane rows. Consequently, with the burners 31a, 31b, separated transversely, the boom 20 may be rotated to dispose the burners to discharge flaming fuel on the windward end portions of stalks stacked across cane rows, as aforesaid, to cover a fair transverse length of stalks, thus to be sure to ignite the dry leaves of the stalks, which can have various transverse dispositions. See FIG. 5.

In FIG. 1 the rows at the lower end of the sheet are shown diagrammatically in transverse sectional delineation. Thus cane is shown stacked upon, and overextending the crown 83a of a left row 83, the cane also over extending in practice, the crown of a row still further to the left, and not shown. Then a passage row 84 is shown with the axis of tractor travel down the center of the crown 84a of this passage row, with left wheels of the tractor to move down the furrow 84b and with right wheels of the tractor to move down the furrow 85b of a next upwind row 85, the downwind ends of cane stalks 82a, 82b, being shown overextending leftwardly the crown 85b of the row 85. Also, these cane stalks overextend the crown of the next upwind row to the right, not shown. Thus passage rows 84 alternate between pairs of cane stacked rows 83, 85. When the tractor reaches the ends of respective rows involved, it best turns in upwind direction to return down the next upwind passage row 84, so that the boom 20 is best swung 90° in downwind direction to dispose the burners 31a, 31b, to discharge upon the windward ends of the cane stalks on the last unburned pair of cane stacked rows just downwind thereof.

The control rod 36, that rotates the large sprocket 22, may be assured of movement in linear, horizontal travel, as by passage through a guide bar 86, shown illustratively in FIG. 2. A lever 87, provided accessible from the driver's seat 13, as in adjacency with the hereinabove described elevation control lever 64, and in adjacency with the conventional throttle lever 65, is shown in FIG. 2, with the upper, rearward end of a push rod 88 being pivotally connected thereto. The lower, forward end of the push rod 88 is pivotally connected to the outer end of a small lever 89 that is rigidly connected to a shaft 90 that is indicated in FIG. 2 as extending transversely, horizontally with relation to the tractor 10. Shown diagrammatically in FIG. 2, such shaft 90 is located within the tractor 10 adjacent the hereinabove described elevation control lever 62 that cuts in the hydraulic system of the transmission to apply force to raise and lower the tool bar 17. The reference numeral 91 to the zagged line shown between the small lever 89 and the shaft 41, designates the application of the force of the hydraulic system, cut in by operation of the lever 89, to rotate the shaft 90. Thus obviously, moving the control lever 87 in one direction cuts in the hydraulic system to rotate the shaft 90 in one direction, as say clockwise, to move the bellcrank lever 40 to draw the control rod 36 forwardly, ultimately to the position indicated in FIG. 1. Also, moving the control lever 87 in the opposite direction, as say counterclockwise, cuts in the hydraulic system of the transmission to move the bellcrank lever 40 to urge the control rod 36 rearwardly, ultimately to position the boom 20 farthest to the right, as shown in FIG. 1.

As long as the control lever 87 is urged against, the hydraulic system of the transmission is cut in, through mesne apparatus and mechanism, to rotate or swing the boom 20, and when the urging against the control lever 87 is discontinued, swinging of the boom 20 ceases. Thus the driver or operator can urge against the lever 87 as he watches the boom 20 swing to dispose the burners in pre-determined, directly rearwardly extending position, and properly transversely disposed with relation to the windward ends of stacked cane stalks. Then he takes his hand off the lever 87 and starts the tractor down the passage row 84.

The invention is not limited to the exact apparatus and method hereinabove described and disclosed and other structural arrangements may accomplish the objects set forth, and the exact method steps in variation may arrive at the same ends of quickly burning the dry leaves and other detritus from stacked cane stalks. However, the structures shown and method steps described are aptly applicable, while the appended claims are by way of illustration.

I claim:

1. A burner positioner for employment with a tractor having a speed control throttle lever, said positioner including mounting means pivoted sidewardly, forwardly, on said tractor and a tool bar horizontally disposed by said mounting means rearwardly of said tractor, a tool bar lowering and raising lever accessible, together with said speed control throttle lever, from the tractor driver's seat, a boom centrally, swingably attached to the tool bar by an included first swing pivot and with opposite end of boom adapted to carry burner means, a tractor mounted, boom swing lever means also accessible from driver's seat and adapted to selectively connect tractor engine hydraulic transmission system to included swing mechanism including tool bar mounted means and also including a second swing pivot on said boom opposite end, said swing mechanism also including means adapting it to swing said boom in direction and extent corresponding with boom swing lever manipulation, said second swing pivot being cooperatively connected with means carried by said boom opposite end to maintain said burner means constantly pointed for rearward flame discharge.

2. The combination as claimed in claim 1, in which said boom swing lever means includes means adapted to swing said boom 180° in travel from perpendicular to axis of tractor travel on one side to perpendicular to axis of tractor travel on the other side.

3. The combination as claimed in claim 1, in which said swing mechanism includes a substantially horizontally movable means adapted to rotate said first swing pivot through a predetermined angular travel corresponding with boom movement through 180° of swing, as from normal to tractor travel left to from normal to tractor to tractor travel right.

4. The combination as claimed in claim 1 in which said burner means comprises a pair of burners transversely spaced apart with axes parallel on either side of and parallel to the axis of said boom opposite end positioner included means.

5. The combination as claimed in claim 1 in which burner fuel is delivered from tractor fuel supply by boom carried conduit means.

6. The combination as claimed in claim 1 in which said tool bar lowering and raising lever, and said boom swing lever are adapted to cut in the tractor hydraulic transmission, at distinctly separate times, respectively to power tool bar selective lowering and raising, and boom swing.

7. The combination as claimed in claim 1, whereby said boom range of travel is accomplished by an appreciably lesser range in degree of travel of a larger diameter sprocket included by the tool bar mounted means of said swing mechanism.

8. The combination as claimed in claim 1, in which said boom opposite end positioner included means includes a burner carrier shaft that is swung in correspondence with boom swing in manner to point continuously directly rearwardly from direction of tractor travel.

9. A burner positioner for employment with a tractor having a speed control throttle lever, said positioner including mounting means pivoted sidewardly, forwardly, on said tractor and a tool bar horizontally disposed by said mounting means rearwardly of said tractor, a tool bar lowering and raising lever accessible, together with said speed control throttle lever, from the tractor driver's seat, a boom centrally, swingably attached to the tool bar by an included first swing pivot with opposite end of boom adapted to carry burner means, a tractor mounted, boom swing lever means also accessible from driver's seat and adapted to selectively connect tractor provided power to included swing mechanism including tool bar mounted means and also including a second swing pivot on said boom opposite end, said swing mechanism also including means adapting it to swing said boom in direction and extent corresponding with boom swing lever manipulation, said second swing pivot being cooperatively connected with means carried by said boom opposite end to maintain said burner means constantly pointed for rearward flame discharge, burner fuel being delivered from tractor fuel supply by boom carried conduit means.

10. A burner positioner as claimed in claim 9, in which said boom swing lever means includes means adapted to swing said boom 180° in travel from perpendicular to axis of tractor travel on one side to perpendicular to axis of tractor travel on the other side.

11. A burner positioner as claimed in claim 9, in which said swing mechanism includes a substantially horizontally movable means adapted to rotate said first swing pivot through a predetermined angular travel corresponding with boom movement through 180 degrees of swing, as from normal to tractor travel left to from normal to tractor travel right.

12. A burner positioner as claimed in claim 9, in which said tractor provided power comprises the engine hydraulic transmission system.

13. A burner positioner as claimed in claim 9 in which said burner means comprises said boom opposite end positioner included means.

14. A burner positioner as claimed in claim 9, in which said tool bar lowering and raising lever, and said boom swing lever are adapted to cut in the tractor hydraulic transmission at distinctly separate times, respectively, to power tool bar selective lowering and raising, and for boom swing.

15. A burner positioner as claimed in claim 9, whereby said boom range of travel is accomplished by an appreciably lesser range in degree of travel of a larger diameter sprocket included by the tool bar mounted means of said swing mechanism.

16. A burner positioner as claimed in claim 9, in which said boom opposite end positioner included means includes a burner carrier shaft that is swung in correspondence with boom swing in manner to pivot continuously directly rearwardly from direction of tractor travel.

17. A burner positioner for employment with a tractor having a speed control throttle lever, said positioner including mounting means pivoted sidewardly, forwardly, on said tractor and a tool bar horizontally disposed by said mounting means rearwardly of said tractor, a tool bar lowering and raising lever accessible, together with said speed control throttle lever, from the tractor driver's seat, a boom centrally, swingably attached to the tool bar by an included first swing pivot with opposite end of boom adapted to carry burner means, a tractor mounted, boom swing lever means also accessible from driver's seat and adapted to selectively connect tractor provided power to included swing mechanism including tool bar mounted means and also including a second swing pivot on said boom opposite end, said swing mechanism also including means adapting it to swing said boom in direction and extent corresponding with boom swing lever manipulation, said second swing pivot being cooperatively connected with means carried by said boom opposite end to maintain said burner means constantly pointed for rearward flame discharge, said tool bar lowering and raising lever, and said boom swing lever being adapted to cut in the tractor hydraulic transmission at distinctly separate times, respectively, to power tool bar selective lowering and raising, and for boom swing.

18. A burner positioner as claimed in claim 17, in which said boom swing lever means includes means adapted to swing said boom 180° in travel from perpendicular to axis of tractor travel on one side of perpendicular to axis of tractor travel on the other side.

19. A burner positioner as claimed in claim 17, in which said swing mechanism includes a substantially horizontally movable means adapted to rotate said first swing pivot through a predetermined angular travel corresponding with boom movement through 180 degrees of swing, as from normal to tractor travel left to from normal to tractor travel right.

20. A burner positioner as claimed in claim 17, in which said tractor provided power comprises the engine hydraulic transmission system.

21. A burner positioner as claimed in claim 17, in which said burner means comprises said boom opposite end positioner included means.

22. A burner positioner as claimed in claim 17, in which burner fuel is delivered from tractor fuel supply by boom carried conduit means.

23. A burner positioner as claimed in claim 17, whereby said boom range of travel is accomplished by an appreciably lesser range in degree of travel of a larger diameter sprocket included by the tool bar mounted means of said swing mechanism.

24. A burner positioner as claimed in claim 17, in which said boom opposite end positioner included means includes a burner carrier shaft that is swung in correspondence with boom swing in manner to pivot continuously directly rearwardly from direction of tractor travel.

* * * * *